United States Patent
Becker et al.

(10) Patent No.: US 7,275,913 B2
(45) Date of Patent: Oct. 2, 2007

(54) ROTOR AND GYROCOPTER WITH SAID ROTOR

(75) Inventors: Gerold Becker, Maisach (DE); Rupert Pfaller, Riemerling (DE)

(73) Assignee: Eurocopter Deutschland GmbH, Donauwoerth (DE)

( * ) Notice: Subject to any disclaimer, the term of this patent is extended or adjusted under 35 U.S.C. 154(b) by 0 days.

(21) Appl. No.: 10/552,320

(22) PCT Filed: Apr. 6, 2004

(86) PCT No.: PCT/EP2004/003643

§ 371 (c)(1),
(2), (4) Date: Oct. 7, 2005

(87) PCT Pub. No.: WO2004/089748

PCT Pub. Date: Oct. 21, 2004

(65) Prior Publication Data
US 2006/0216151 A1 Sep. 28, 2006

(30) Foreign Application Priority Data
Apr. 8, 2003 (DE) ................................ 103 16 095

(51) Int. Cl.
B64C 27/39 (2006.01)
(52) U.S. Cl. ................. 416/134 A; 416/244 R
(58) Field of Classification Search ............ 416/134 A, 416/138, 141, 230, 244 R
See application file for complete search history.

(56) References Cited

U.S. PATENT DOCUMENTS

| | | | |
|---|---|---|---|
| 3,874,815 A | 4/1975 | Baskin | |
| 4,093,400 A | 6/1978 | Rybicki | |
| 4,299,538 A | 11/1981 | Ferris et al. | |
| 4,307,996 A * | 12/1981 | Watson | 416/141 |
| 4,344,739 A * | 8/1982 | Derschmidt et al. | 416/141 |
| 4,381,902 A * | 5/1983 | Head et al. | 416/134 A |
| 4,650,401 A * | 3/1987 | Yao et al. | 416/134 A |

FOREIGN PATENT DOCUMENTS

EP 0 521 792 1/1993

OTHER PUBLICATIONS

International Search Report for PCT/EP2004/003643 (3 pages).

* cited by examiner

*Primary Examiner*—Richard A. Edgar
(74) *Attorney, Agent, or Firm*—Darby & Darby

(57) ABSTRACT

A rotor, comprising at least one rotor blade connectable to a rotor head, which rotor blade possesses a blade neck having a virtual flapping hinge in the form of a flexurally soft, flexurally elastic blade-neck portion, there being provided, in a blade-connector region of the blade neck, two auxiliary flapping hinges, spaced apart from one another in the radial longitudinal direction of the rotor blade with reference to a rotor radius, between which the virtual flapping hinge is substantially disposed and between which the blade neck is deformable in flexurally elastic and curved fashion in the context of a flapwise motion. A rotorcraft, in particular a helicopter, in particular a tiltrotor helicopter, having at least one such rotor.

31 Claims, 7 Drawing Sheets

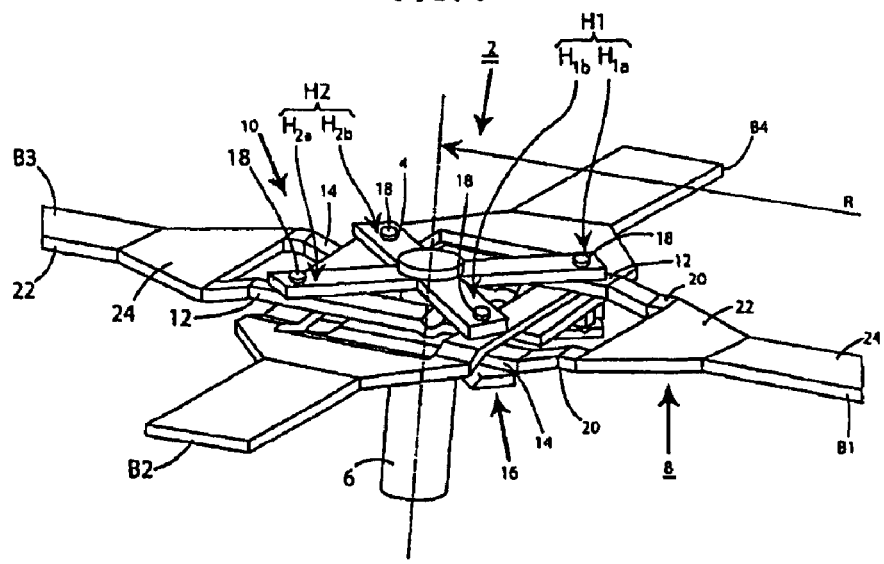
FIG. 1
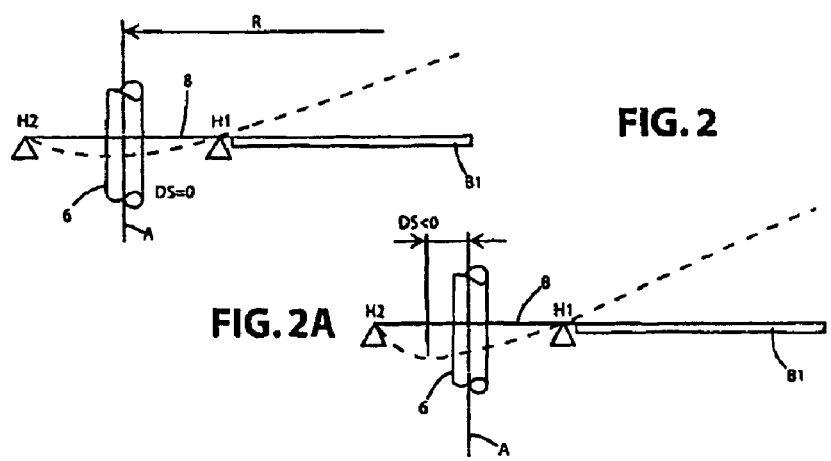
FIG. 2
FIG. 2A
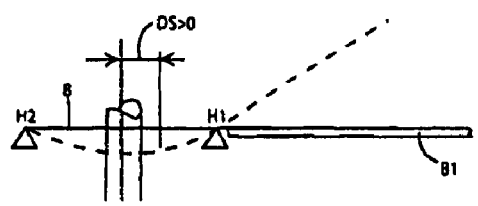
FIG. 2B

ROTOR AND GYROCOPTER WITH SAID ROTOR

The present invention relates to a rotor and to a rotorcraft, in particular a helicopter, having such a rotor.

BACKGROUND

The lift-generating rotor blades of a rotor for a rotorcraft, in particular a helicopter, are deflected in various directions during continuous rotor operation, in particular by flapwise and lead-lag motions, and heavily stressed as a result. Rotor blades nowadays are manufactured predominantly from fiber composite materials.

In a bearingless rotor according to the existing art, as shown in FIG. 14, bearingless rotor blades are mounted on the rotor head usually via a rotor-head plate. The rotor-head plate has rotor-head-side blade connectors, embodied in accordance with the number of rotor blades, that are each joined to a structural element of a rotor blade. This structural element 142 is embodied, at a radially inner (with reference to the rotor disc) end of the rotor blade, i.e. the end facing toward the rotor head, with a rotor-head-side blade connector 144 that makes possible a connection to the rotor head. The transition from this blade connector 144 to the lift-generating rotor-blade regions is embodied as a blade neck 146. Structural element 142 transfers the drive torque from a rotor mast and the rotor head to the rotor blade. Structural element 142 furthermore transfers the centrifugal forces of the rotor blade to the rotor head. To allow structural element 142 to be separately fabricated and replaced in the event of damage, a separate disconnect point is often incorporated between structural element 142 and the rotor blade. The lift-generating rotor-blade region extends from this disconnect point to the outermost end, i.e. the blade tip, of the rotor blade. Serving as the disconnect point are, for example, at least two respective bolts that engage on the blade-end and rotor-head-side blade connectors. In FIG. 14, the rotor blade in the rotor-blade-side blade connector 144 is connected to the rotor head via two bolts 148. The centrifugal forces and the lead-lag moment are discharged via bolts 148. The flapping moment is also discharged via these bolts 148, usually assisted by an upper and a lower contact surface of structural element 142 on the rotor-head plate.

Blade neck 146 of structural element 142 of a bearingless rotor blade, which in the present technical field is also referred to as a flex beam and is enclosed by a so-called control bag 150, usually possesses a lead-lag-soft region that permits motions of the rotor blade in the lead-lag direction. The lead-lag-soft region thus constitutes a fictitious vertically oriented axis (also called a virtual lead-lag hinge) about which the rotor blade executes forward and backward lead-lag motions. In addition, blade neck 146 of structural element 142 usually has a flapwise-soft region that enables flapping of the blade in the vertical direction. The flapwise-soft region thus constitutes a fictitious horizontally oriented axis (also called a virtual flapping hinge) about which the rotor blade executes upward and downward flapwise motions. The distance between the virtual flapping hinge and the rotor axis of the rotor mast is referred to as the flapping hinge distance.

In a bearingless rotor, this flapping hinge distance is relatively large. The flapping hinge distance is, for example, approximately 8 to 12% of the rotor-disc radius, measured from the rotor axis of the rotor mast radially outward to the blade tip. A large flapping hinge distance in a bearingless rotor results, during operation, on the one hand in good helicopter control response and maneuverability, but on the other hand, in particular, in a high natural flapping frequency. This relative high natural flapping frequency, and the vibrations that result therefrom in the bearingless rotor, are disadvantageous in terms of the helicopters flying characteristics, and lead to large stresses on blade connector 144 and blade neck 146. Blade connector 144 and blade neck 146 must therefore have correspondingly large dimensions in order to withstand the stress that occurs. In conventional helicopter rotors, a low natural flapping and lead-lag frequency is desirable for these reasons.

Because of the large stresses on the rotor blade in a bearingless rotor, and the strength of those components that must therefore be ensured, it is extremely difficult to reduce the flapping hinge distance or decrease it below a specific value. In conventional bearingless rotors, a small flapping hinge distance would considerably reduce the durability and service life of the rotor blade in question, which of course is disadvantageous or even hazardous. On the other hand, however, a small flapping hinge distance would be desirable for a variety of applications, since helicopters having such rotor blades are generally perceived by pilots, crew members, and passengers as being more comfortable.

In special rotors, for example tilting rotors (so-called tiltrotors) of tiltrotor helicopters or aircraft, a particularly lead-lag-stiff rotor is required for various reasons.

SUMMARY OF THE INVENTION

An object and a technical problem on which the invention is based is that of creating a rotor for a rotorcraft, which rotor ensures improved flying properties, greater flying comfort, and greater safety and reliability, and is also suitable in at least one embodiment as a tilting rotor for a tiltrotor rotorcraft. A rotorcraft having such a rotor is also to be made available.

The present invention provides a rotor, comprising at least two rotor blades connectable to a rotor head, which each possess a blade neck having a virtual flapping hinge in the form of a flexurally soft, flexurally elastic blade-neck portion, there being provided, in a blade-connector region of the blade neck, two auxiliary flapping hinges, which are spaced apart from one another in the radial longitudinal direction of the rotor blade with reference to a rotor radius. Between which the virtual flapping hinge is substantially disposed and between which the blade neck is deformable in flexurally elastic and curved fashion in the context of a flapwise motion. The blade-connector region of the blade neck of a respective rotor blade, which region contains the two auxiliary flapping hinges and the virtual flapping hinge located therebetween, is embodied in the form of a blade-connector arm; the rotor blades are joined to one another via their blade-connector arms; the blade-connector arms of the rotor blades that are joined to one another overlap at least in subregions; and one respective auxiliary flapping hinge is located in the overlap region of the connector arms.

This rotor encompasses at least one rotor blade connectable to a rotor head, which rotor blade possesses a blade neck having a virtual flapping hinge in the form of a flexurally soft, flexurally elastic blade-neck portion, there being provided, in a blade-connector region of the blade neck, two auxiliary flapping hinges, spaced apart from one another in the radial longitudinal direction of the rotor blade with reference to a rotor radius, between which the virtual flapping hinge is substantially disposed and between which the blade neck is deformable in flexurally elastic and curved fashion, or additionally deformable, in the context of a flapwise motion. Depending on the configuration of the blade neck, the latter can have a symmetrical or asymmetrical flexion line.

The axes or apparent axes of the auxiliary flapping hinges preferably extend substantially parallel to the structural or natural flapwise axis of the rotor blade. In other words, the axes of the auxiliary flapping hinges preferably extend substantially parallel to the flapwise axis formed by the virtual flapping hinge. The two auxiliary flapping hinges form a kind of two-point bearing that supports the blade neck, in articulated or apparently articulated fashion, at two locations spaced apart from one another in the radial direction of the rotor blade. The auxiliary flapping hinges can be embodied at least partially in a differential design and/or as an integral component of the rotor blade and/or the rotor head or its components.

The manner of achieving the object of the present invention allows the provision of a rotor, in particular a so-called hingeless and bearingless rotor, in which the rotor blade or blades can be connected to the rotor head or rotor mast in flexurally soft fashion and with a small virtual flapping hinge distance that is considerably reduced as compared with previously known bearingless rotors. It is possible as a result to improve the flying properties of a rotorcraft equipped with such a rotor, and considerably to increase flying comfort.

The rotor according to the present invention furthermore exhibits less vibration than conventional bearingless rotors, which in turn has a positive effect on the flying properties and comfort of the rotorcraft and reduces loads on the blade connector and blade neck of a particular rotor blade. It is therefore not necessary to make the dimensions of the blade-connector region of the rotor blade as large as in the case of a conventional bearingless rotor blade, since the forces and moments that occur can be transferred more advantageously and more favorably. The weight of the rotor blade, and hence in turn the total weight of the rotor, can consequently be reduced.

The two auxiliary flapping hinges, which, as will be explained in even further detail below, can also perform load-discharging functions and thereby ensure redundancy, furthermore greatly reduce the probability of malfunction and failure in the rotor according to the present invention. A fail-safe design can thus be implemented for the rotor. Despite the small flapping hinge distance, the rotor according to the present invention possesses excellent durability and service life. In contrast to the existing art, moreover, a separate disconnect point between the blade connector and the rotor blade is not necessary. The rotor concept according to the present invention can be implemented for rotors having one or more rotor blades and an even or odd number of rotor blades.

Because it can be embodied both with a small flapping hinge distance and, if necessary, with very lead-lag-stiff rotor blades, the rotor according to the present invention is very advantageous in particular for tiltrotor rotorcraft. This is because in a tilting rotor, the virtual flapping hinge must be disposed as centrally as possible, i.e. the flapping hinge distance should ideally be 0%. This requirement can be entirely met by the rotor according to the present invention. Only in this fashion can the lead-lag deformations that otherwise occur upon flapping of the rotor blade as a result of Coriolis forces be avoided. With a lead-lag-stiff rotor design and undiminished Coriolis forces, on the other hand, it might become impossible to guarantee rotor strength.

Further preferred and advantageous embodiment features of the rotor according to the present invention are the subject matter of the claims.

The present invention also provides a rotorcraft, in particular a helicopter, in particular a tiltrotor helicopter, having at least one rotor.

This rotorcraft possesses substantially the same advantages that have already been described in conjunction with the rotor according to the present invention. In particular, this rotorcraft can be embodied in particularly advantageous fashion as a tiltrotor helicopter.

Preferred exemplifying embodiments of the invention, with additional configuration details and further advantages, are described in more detail and explained below with reference to the appended drawings.

BRIEF DESCRIPTION OF THE DRAWINGS

In the Figures:

FIG. 1 is a schematic perspective plan view of a rotor according to the present invention in accordance with a first embodiment;

FIG. 2 is a schematic, greatly simplified side view of the rotor of FIG. 1 depicting a single rotor blade, the apparent flapping hinge distance being equal to zero;

FIG. 2a is a depiction analogous to FIG. 2, for an apparent flapping hinge distance less than zero;

FIG. 2b is a depiction analogous to FIG. 2, for a small apparent flapping hinge distance greater than zero;

DETAILED DESCRIPTION

Figure 3:
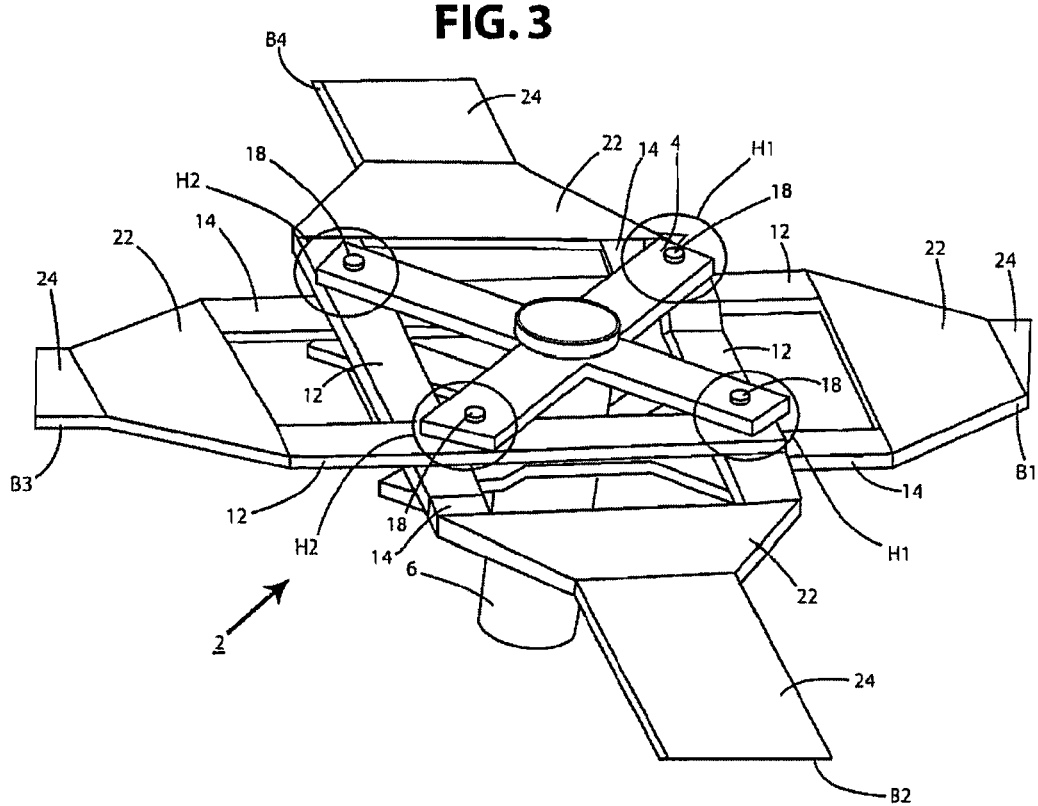
FIG. 3 is a schematic perspective plan view of a rotor according to the present invention in accordance with a second embodiment.

In the description that follows and in the Figures, in order to avoid repetition, identical constituents and components are be labeled with identical reference characters provided no further differentiation is necessary.

FIG. 1 is a schematic perspective plan view of a hingeless rotor according to the present invention in accordance with a first embodiment. The rotor encompasses a rotor head 2 having a plate-shaped, four-armed rotor star 4, flexurally soft in the flapwise direction, that engages nonrotatably on a rotor mast 6 and serves as a torque-transmission element, as well as four similarly configured rotor blades B1, B2, B3, B4. For the sake of clarity, the lift-generating regions of the rotor blades are not depicted in the drawing. The rotor blades are fabricated substantially from fiber composite material. Each two rotor blades B1, B3; B2, B4 that constitute a rotor blade pair are located at a 180-degree offset from one another. The two rotor blade pairs thus formed are in turn disposed at a 90-degree offset from one another. Each rotor blade possesses, for example, a blade neck 8 having flexurally soft, flexurally elastic blade-neck portions. Rotor blades B1, B2, B3, B4 are connected, in the region of their blade-neck portions, nonrotatably to rotor mast 6 via rotor star 4. The rotor blades are furthermore joined to one another in a manner to be described in further detail below.

FIG. 2 is a schematic, greatly simplified side view of the rotor of FIG. 1. For the sake of simplicity, only a single rotor blade B1 is depicted in this drawing. The explanations that follow also apply analogously, however, to the other rotor blades. As is evident from FIG. 2, there are provided, in a blade-connector region of blade neck 8 of rotor blade B1, two respective auxiliary flapping hinges H1, H2 that are spaced apart from one another in, or predominantly in, the radial direction with reference to rotor radius R of the rotor, i.e. in the longitudinal direction of rotor blade B1. Auxiliary flapping hinges H1, H2 thus support blade neck 8 in articulated or apparently articulated fashion at two locations spaced apart from one another in the radial direction of the rotor. The result is a kind of two-point bearing. Between these two auxiliary flapping hinges H1, H2, blade neck 8 is deformable in flexurally elastic and curved fashion in the context of a flapwise motion of rotor blade B1. The deflection of rotor blade B1 and the flexion of blade neck 8 are indicated by a dashed line. As a result of this configuration, rotor blade B1 behaves in its totality, in the context of a flapwise motion, as if its flapping hinge were apparently located exactly on rotor axis A. The (apparent) flapping hinge distance DS of this virtual flapping hinge is thus zero (DS=0). In the Figures that follow, auxiliary hinges H1, H2 are for the most part always indicated only for a single rotor blade, for better clarity. The disposition of the auxiliary hinges for the other rotor blades is analogous.

FIG. 2a sketches, as a comparison and by analogy with the depiction of FIG. 2, a case in which the (apparent) flapping hinge distance DS is negative, i.e. less than zero (DS<0). FIG. 2b in turn sketches, by analogy with the depiction of FIG. 2, a case in which the (apparent) flapping hinge distance is greater than zero (DS>0) but is still very small, i.e. located very close to rotor mast 6, as compared with conventional hingeless rotors.

Looking from above or below at the rotor-disc plane of the rotor shown in FIG. 1, it is particularly clearly evident that the blade-connector region of a respective rotor blade B1, B2, B3, B4, containing the two auxiliary flapping hinges H1, H2 and the virtual flapping hinge located therebetween, is embodied in the form of a blade-connector fork 10 having two (or even more) narrow strip- or plate-shaped connector arms 12, 14 that function, inter alia, as tension straps. These two connector arms 12, 14, spaced apart from one another in the tangential direction with reference to the rotor disc and in the depth direction of the rotor blade profile with reference to the respective rotor blade B1, B2, B3, B4, extend substantially in the longitudinal direction of the rotor blade and substantially parallel to one another laterally to the left and right alongside rotor mast 6 or rotor axis A, continuing past it in the radial direction. Rotor axis A thus extends between the two connector arms 12, 14. In this example, connector arms 12, 14 possess less flexural stiffness, or a lower geometrical moment of inertia, in the flapwise direction of the rotor blade than in the lead-lag direction.

Each two mutually oppositely located rotor blades B1, B3; B2, B4 of a rotor blade pair are joined to one another in the longitudinal direction via their blade-connector forks 10, i.e. their connector arms 12, 14. Connector arms 12, 14 overlap in their longitudinal direction at least in a subregion, i.e. in the present case substantially over their entire length. Each two connector arms 12, 14 of the respective rotor blades extend one above another. As a result of this disposition and the mutual joining, connector arms 12, 14 of the one respective rotor blade (e.g. B1) receive the centrifugal forces of the other respective rotor blade (e.g. B3), and the centrifugal forces are directed past rotor mast 6. Ideally, therefore, the centrifugal forces of rotor blades B1, B2, B3, B4 have no effect on the configuration of the mast attachment of rotor blades B1, B2, B3, B4.

As is also evident from FIG. 1, connector arms 12, 14 of the first rotor blade pair furthermore overlap or cross over connector arms 12, 14 of the second rotor blade pair. As a result, four connector arms, i.e. one connector arm of each rotor blade B1, B2, B3, B4, lie one above another in the resulting crossover region 16. At crossover region 16, connector arms 12, 14 are joined both to one another and to rotor star 4. The joint is made, in this example, with a one bolt 18 in each case that extends, approximately parallel to rotor axis A, through rotor star 4 and through the respective connector arms 12, 14. For the rotor shown in FIG. 1, four bolts 18 are thus required in order to join rotor blades B1, B2, B3, B4, via their connector arms 12, 14, to one another and to rotor star 4.

This assemblage possesses multifunctional properties, as will become evident from the explanations that follow.

Each crossover region 16 of connector arms 12, 14, which are flexurally elastic and flexurally soft in the flapwise direction, forms, together with bolts 18, an auxiliary flapping hinge H1, H2 between the anus of rotor star 4. One auxiliary flapping hinge H1, H2 is thus located in each overlap region or crossover region 16 of connector arms 12, 14 of rotor blades B1, B2, B3, B4. Two auxiliary flapping hinges H1, H2 spaced apart from one another in the longitudinal direction of rotor blade B1, B2, B3, B4 are thus also created for each rotor blade B1, B2, B3, B4. Because blade-connector fork 10 of the respective rotor blade B1, B2, B3, B4 has two connector arms 12, 14, each auxiliary flapping hinge H1, H2 has two hinge regions H1a, H1b; H2a, H2b located laterally next to one another, and, for each connector arm 12, 14, two bolts 18 spaced apart from one another in the radial direction and two spaced apart from one another in a tangential direction. The two connector arms 12, 14 can deform or deflect between the two radially spaced-apart bolts 18 when the blade (in this case e.g. B1) is loaded in the flapwise direction, in this context, the arms of rotor star 4 can likewise participate in a certain deformation. All this results in an additional softness that in turn results in a smaller flapping hinge distance.

In FIG. 1, references characters H1 and H2 apply only to the auxiliary flapping hinges of rotor blade B1. The statements above are applicable analogously to the other rotor blades B2, B3, B4. Because of this configuration and the previously explained disposition of rotor blades B1, B2, B3, B4, each rotor blade pair, comprising two rotor blades B1, B3; B2, B4 opposite one another, possesses two common auxiliary flapping hinges H1, H2 and, so to speak, one common virtual flapping hinge.

Because the rotor encompasses two rotor blade pairs in the present case, all the rotor blade pairs B1, B2, B3, B4 moreover possess common auxiliary flapping hinges H1, H2 that are located in a common blade-neck joining region, namely in the respective crossover region 16. Because of the flexural softness of connector arms 12, 14 and of rotor star 4, these crossover regions 16 can also follow to a large extent the flexion of connector arms 12, 14 without thereby resulting in too large a discontinuity in the flexion line. To allow connector arms 12, 14, in the context of a flapping motion, also to deflect elastically even more easily in the crossover region or beyond it, it is possible, for example, to provide, in the region of bolt 18, convex contact surfaces on connector arms 12, 14 and/or on rotor star 4, or to make available corresponding intermediate elements. The latter disposition is recommended if, for example, rotor star 4 is embodied to be relatively stiff in the flapwise direction.

As already briefly alluded to above, each rotor blade B1, B2, B3, B4 is joined nonrotatably to rotor mast 6, in the region of the two auxiliary flapping hinges H1, H2, via rotor star 4 and bolts 18. Bolts 18 of auxiliary flapping hinge H1, H2, together with the rotor star, consequently also serve simultaneously as torque-transmission elements. These torque-transmission elements engage on a portion of rotor blades B1, B2, B3, B4 at which multiple connector arms 12, 14 overlap and in which at least one of auxiliary flapping hinges H1, H2 is located.

As indicated by the reference character 20 in FIG. 1, blade neck 8 furthermore possesses a further flexurally soft, flapwise-soft blade neck portion 20 in a region that is adjacent, with reference to rotor radius R and the longitudinal direction of rotor blade B1, B2, B3, B4, to the radially outer of the two auxiliary flapping hinges H1, H2 in the direction toward the rotor-blade tip (not shown). This portion 20 additionally improves the flexural and deformation properties of connector arms 12, 14 in the context of a flapwise motion.

It should furthermore be emphasized that with the design according to the present invention, the two auxiliary flapping hinges H1, H2, or parts thereof, function as centrifugal-force-discharge elements. For example, bolts 18 of auxiliary flapping hinges H1, H2 of a respective rotor blade B1, B2, B3 B4 form, for each connector arm 12, 14, two centrifugal-force-discharge elements disposed one behind another and spaced apart from one another in the longitudinal direction of the blade (or the centrifugal-force direction). During continuous operation of the rotor, at least one of these bolts 18 receives the centrifugal forces occurring in rotor blade B1, B2, B3, B4 and introduces them into the respective connector arm 12, 14. Each centrifugal-force segment, i.e. each connector arm 12, 14 of the blade connector, is therefore doubly mounted and retained in the centrifugal-force direction by two bolts 18 in each case. It is entirely sufficient in this context, but of course not absolutely necessary, for one of the two bolts 18 or bearings to receive the centrifugal force. If the first, radially outer bolt 18 performs this task, the region between the two auxiliary flapping hinges H1, H2 is then centrifugal-force-free during continuous operation of the rotor, thus increasing the deflection of this region and the flapwise softness. This construction offers an advantageous redundancy, since in the event of failure of one of the two bolts 18, the centrifugal force can then still be received by the second bolt 18.

Figure 14:
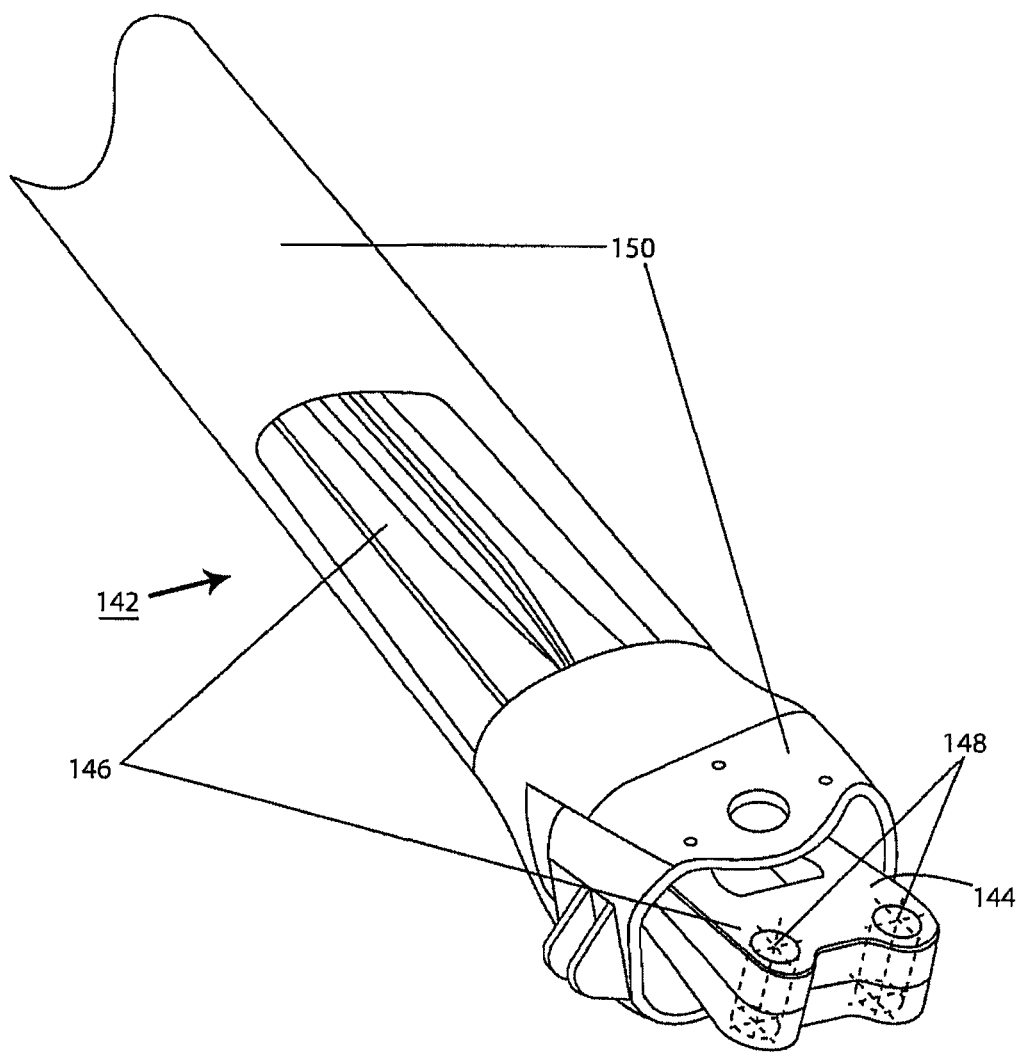
FIG. 14 is a schematic perspective view of a substantial region of a rotor blade of a bearingless rotor in accordance with the existing art.

It must furthermore be kept in mind that in the rotor according to the present invention, a single rotor blade B1, B2, B3, B4 is held and retained by a total of four bearing points or bolts 18, since the respective rotor blade B1, B2, B3, B4 possesses, because of blade-connector fork 10, two connector arms 12, 14 each having two bearing points or bolts 18. This is significant in particular in terms of improved safety in the lead-lag direction. Specifically, if one of the four bolts 18 fails, the respective rotor blade B1, B2, B3, B4 continues to be held in moment-fixed fashion in the lead-lag direction, and can still transfer torque from rotor mast 6 and rotor star 4. The influence of a bolt failure on flight mechanics is consequently not so severe as in conventional designs according to the existing art (see FIG. 14), in which, if one of two bolts fails, the rotor blade is then no longer mounted moment-fixed in the lead-lag direction but is rotatable. Overall, therefore, it is possible with the rotor according to the present invention to implement, in comparatively simple and effective fashion, a fail-safe design that offers excellent safety.

Because rotor blades B1, B2, B3, B4 are joined to one another in the region of their auxiliary flapping hinges H1, H2, a respective auxiliary flapping hinge H1, H2—or a part thereof (i.e. a bolt 18)—of a respective rotor blade (e.g. B1) simultaneously also constitutes a centrifugal-force-discharge element for at least one respectively other rotor blade (e.g. B3). The number of components required for the rotor is thereby considerably reduced.

Connector arms 12, 14 of a respective rotor blade B1, B2, B3, B4 transition outward in the radial direction into a wide, plate-like, trapezoidal base portion 22 that, when viewed in plan, tapers radially outward and terminates in a strip-shaped, distal (i.e. facing away from the rotor mast) blade-neck region 24 adjoining which is the actual lift-generating profiled region of rotor blade B1, B2, B3, B4. Both connector arms 12, 14 and base portion 22, and the strip-shaped blade-neck region 24, are torsionally soft, so that a torsionally soft blade neck for bearingless blade angle adjustment can be implemented in simple fashion. These blade-neck regions, which per se are relatively flat in configuration, can moreover quite easily be enclosed or configured in aerodynamically favorable fashion. This configuration, and the fact that the two connector arms 12, 14 of a respective rotor blade B1, B2, B3, B4 are guided laterally past rotor axis A or rotor mast 6, and also, consequently, that bolts 18 are spaced relatively far apart from one another in the tangential direction with reference to the rotor disc, yields further advantages.

What results from this construction is a rotor-blade connector having a high lead-lag stiffness as compared with conventional rotors. In this context, connector arms 12, 14 which warp slightly in elastic fashion in the context of a lead-lag motion in the lead-lag direction, as well as bolts 18 and, if applicable, the arms of rotor star 4 as well (which can likewise warp slightly in elastic fashion), assume the function of a lead-lag hinge. The lead-lag torque is transferred via bolts 18, which form a wide support base and are thus only lightly loaded.

It is further evident from FIG. 1 that the two connector arms 12, 14 of a respective rotor blade B1, B2, B3, B4 are bent upward and downward several times, so that the two connector arms 12, 14, or substantial portions thereof, extend in different planes. Connector arms 12, 14 have downwardly bent or downwardly stepped free ends. With the disposition depicted in the drawing, what therefore results when rotor blades B1, B2, B3, B4 are in the installed state is an interleaving of their connector arms 12, 14, leading to a very low overall physical height for rotor head 2. The interleaving is selected so that rotor blades B1, B2, B3, B4 lie in a common rotor plane or rotor-blade plane. Taking into account the features already explained above, it is thus possible to implement a bearingless and hingeless rotor having a virtual flapping hinge, a stiff lead-lag hinge, and a torsionally soft blade neck for bearingless blade angle adjustment.

In principle, however, the two connector arms 12, 14 of a respective rotor blade B1, B2, B3, B4 can also lie in a common plane, or in a common plane with the base portion and the strip-shaped blade-neck region. An embodiment of this kind is shown in FIG. 3, which is a schematic, perspective plan view of a rotor according to the present invention in accordance with a second embodiment. Here, for each rotor blade B1, B2, B3, B4, the free end of one connector arm 12, 14 is bent or stepped upward, and that of the other one downward.

Figure 4:
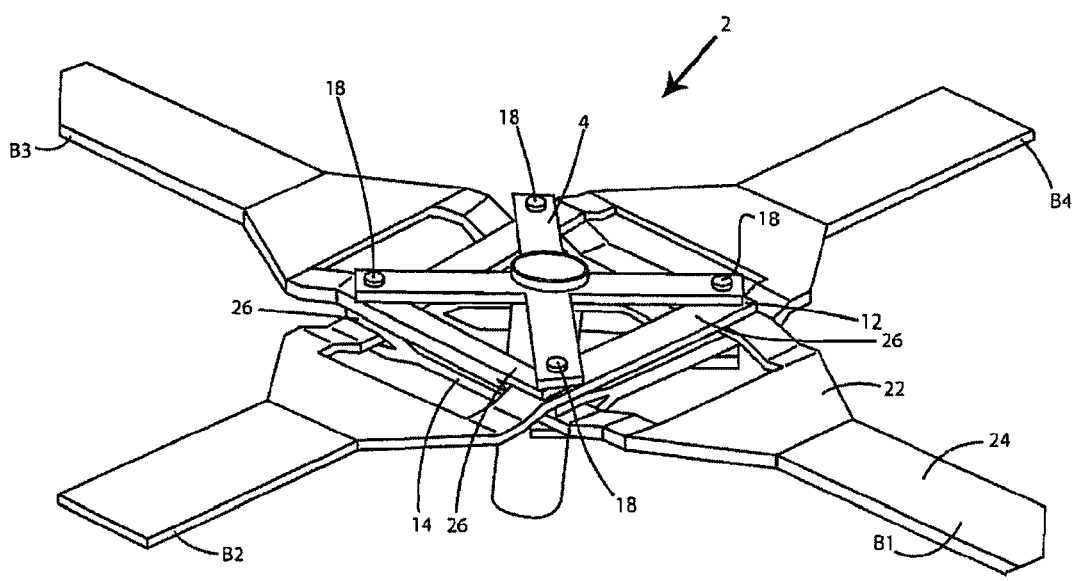
FIG. 4 is a schematic perspective plan view of a rotor according to the present invention in accordance with a third embodiment.

FIG. 4 is a schematic, perspective plan view of a rotor according to the present invention in accordance with a third embodiment. This variant is largely similar to that of FIG. 1, but the free ends of connector arms 12, 14 of a rotor blade B1, B2, B3, B4 are each embodied in the form of a fork terminal 26. With the rotor in the assembled state, fork terminal 26 is located in the region of an auxiliary flapping hinge H1, H2 and is joined to a strip-shaped region, located in the vicinity of base portion 22, of a connector arm 12, 14 of a respectively adjacent rotor blade. Fork terminals 26 make it possible to achieve greater retention strength in the joining points located at auxiliary flapping hinges H1, H2, and easier positionability during the assembly of rotor blades B1, B2, B3, B4.

Figure 5:
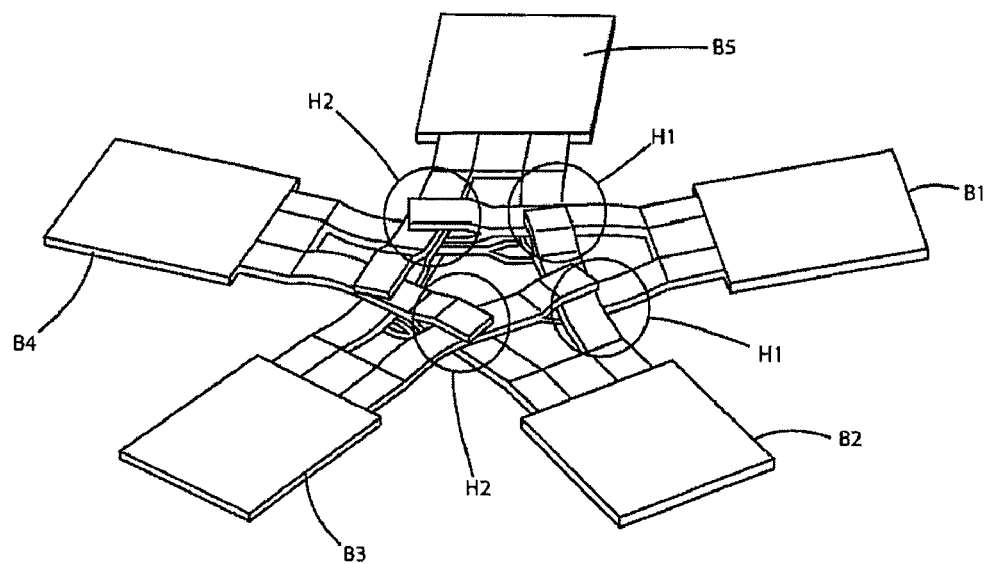
FIG. 5 is a schematic perspective plan view of a rotor according to the present invention in accordance with a fourth embodiment.

FIG. 5 is a schematic, perspective plan view of a rotor according to the present invention in accordance with a fourth embodiment. This variant is similar to that of FIG. 4, but the rotor here is one having an odd number of rotor blades, i.e. in the present case five rotor blades B1 to B5. Although here rotor blades B1 to B5 are not located exactly oppositely in respective pairs at a 180-degree angle, a particular rotor blade can still discharge centrifugal force components of the rotor blades located respectively opposite at an acute angle.

Figure 6:
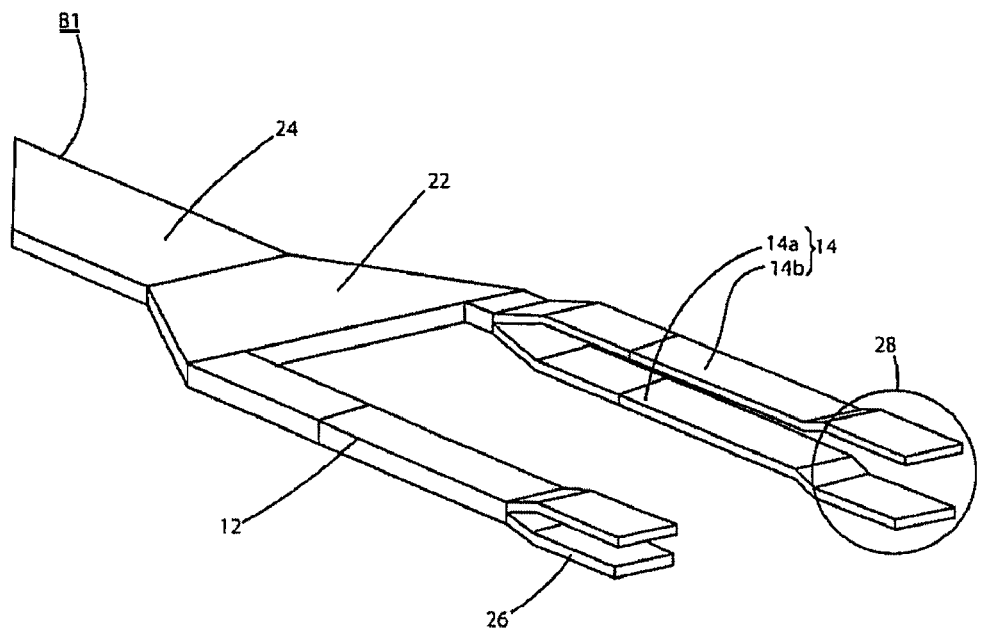
FIG. 6 is a schematic perspective view of a blade-connector region of a rotor blade of a rotor according to the present invention in accordance with a fifth embodiment.
Figure 7:
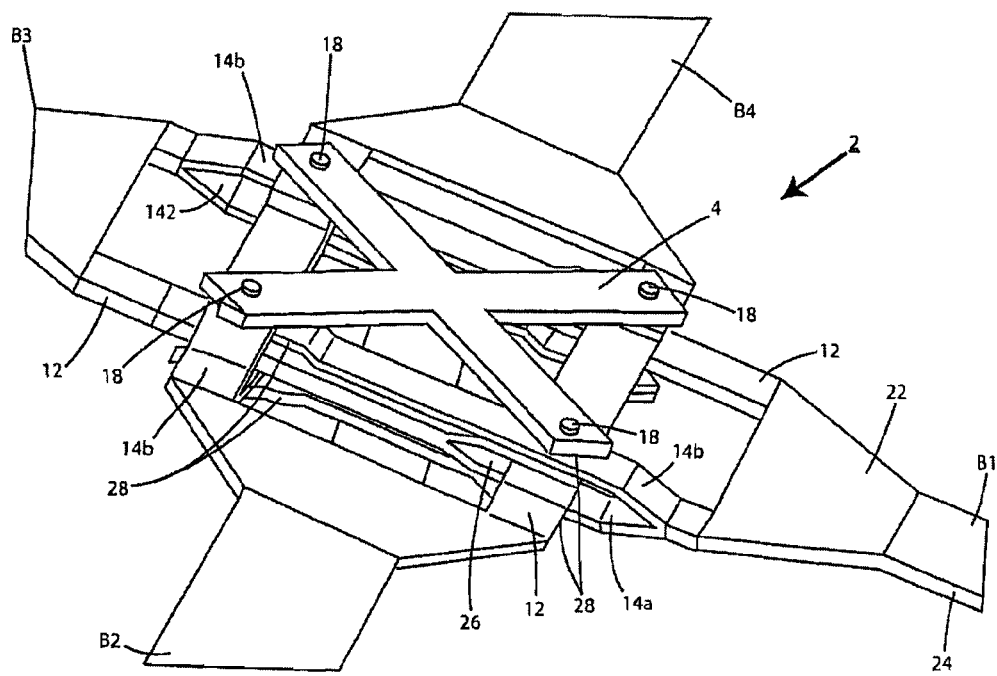
FIG. 7 is a schematic perspective plan view of the rotor according to the present invention in accordance with the fifth embodiment.

FIG. 6 depicts, in a schematic perspective view, a blade-connector region of a rotor blade B1 of a rotor according to the present invention in accordance with a fifth embodiment. FIG. 7 is a schematic perspective plan view of the rotor according to the present invention in accordance with the fifth embodiment. As is apparent in particular from FIG. 6, in rotor blades B1, B2, B3, B4 of this rotor, one of the two connector arms 12, 14 is divided into two connector arm segments 14*a*, 14*b*, located one above another, that extend at a distance from one another. Connector arm segments 14*a*, 14*b* are thus, so to speak, layered one above another. The free ends of connector arm segments 14*a*, 14*b* are bent or stepped upward and downward, and together form a kind of connector claw 28. The free end of the other, undivided connector arm 12 is once again configured in the form of a fork terminal 26.

With the rotor blades in the assembled state (see FIG. 7), of a first rotor blade pair, one respective fork terminal 26 of a rotor blade B1, B2, B3, B4 engages in the longitudinal direction between the connector arm segments 14*a*, 14*b*, located one above another, of the rotor blade located exactly opposite; of the rotor blades of the second rotor blade pair offset 90 degrees, a strip-shaped arm portion of the undivided connector arm 12 extends through fork terminal 26 located between connector arm segments 14*a*, 14*b*; and connector claw 28 of connector arm 14 (which possesses two connector arm segments 14*a*, 14*b*) located opposite that arm portion engages above the upper and lower connector segment of the rotor blade of the first rotor blade pair. This disposition is identical at all the auxiliary flapping hinges H1, H2.

The variant described above provides for better symmetry of the rotor-blade connectors, and reduces the connection stiffness and therefore the flapwise stiffness of the particular rotor blade. This is conditioned primarily by the overall lower flexural stiffness of the individual connector arm segments 14*a*, 14*b* in the flapwise direction, as well as the lower overall flexural stiffness, resulting therefrom, of connector arm 14. As compared therewith, an undivided connector arm possesses a far higher flexural stiffness.

Figure 8:
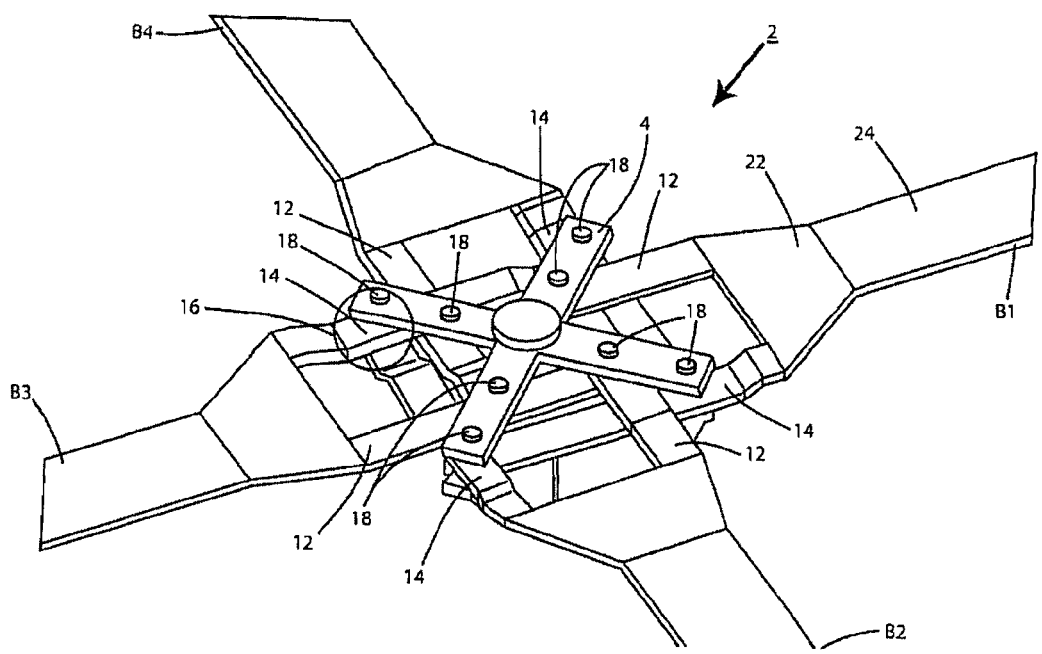
FIG. 8 is a schematic perspective plan view of a rotor according to the present invention in accordance with a sixth embodiment.

FIG. 8 is a schematic perspective plan view of a rotor according to the present invention in accordance with a sixth embodiment. This variant is largely similar to those of FIGS. 1, 4, and 7. As is clearly apparent from the drawing according to FIG. 8, however, here the connector arms 12, 14 of the mutually oppositely located rotor blades B1, B3; B2, B4 of a rotor-blade pair are disposed in offset fashion alongside one another. There are therefore always only two connector arms 12, 14 located one above another in a respective crossover region or overlap region 16 of connector arms 12, 14 of all the rotor blades B1, B2, B3, B4. A further result of this design is that a total of eight bearing points or bolts 18 are necessary in order to join all the connector arms 12, 14 to one another and to rotor star 4, and to transmit torque from rotor star 4 to rotor blades B1, B2, B3, B4. With this variant, furthermore, one connector arm 12 lies in the same plane with the trapezoidal base portion 22 and the distal strip-shaped blade-neck region 24. The other connector arm 14 is bent or stepped downward (upward is also possible) with respect to that plane in several portions. The advantage of this embodiment is a lower overall height in the overlap region or crossover region 16, as well as a greater flexural softness resulting therefrom, i.e. a softer flapping behavior, of rotor blades B1, B2, B3, B4.

Figure 9:
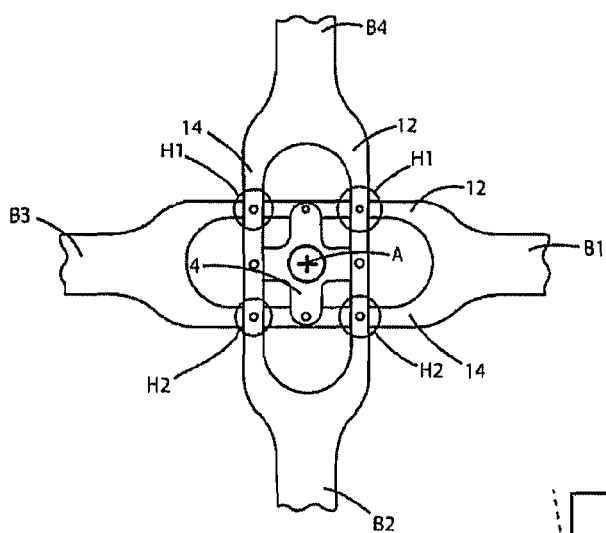
FIG. 9 is a schematic plan view of a rotor according to the present invention in accordance with a seventh embodiment.

FIG. 9 is a schematic perspective plan view of a rotor according to the present invention in accordance with a seventh embodiment. In this variant, in which each two rotor blades B1, B3; B2, B4 are located exactly opposite one another at a 180-degree offset, the respective connector arms 12, 14 of these rotor blades B1, B2, B3, B4 are embodied continuously, i.e. with no interruption. As a result, the centrifugal-force segment formed by connector arms 12, 14 is likewise continuous. This has the advantage that the considerable centrifugal forces of a rotor blade (e.g. B1) can be transferred directly by the oppositely located rotor blade (e.g. B3). At the same time, the respective rotor blade pair B1, B3; B2, B4 possesses two common auxiliary flapping hinges H1, H2 and a common or different virtual lead-lag-hinge.

The flapwise-soft connection of rotor blades B1, B2, B3, B4 is then in turn produced by the fact that connector arms 12, 14 can once again deflect between auxiliary flapping hinges H1, H2. This results in a greater softness in the connection region. This design is moreover very flat. As compared with the examples explained earlier, the mounting points of rotor star 4 engage not directly at auxiliary flapping hinges H1, H2, but rather at a position rotated 45 degrees therefrom. That position is located in each case in a central portion of a segment of the relevant connector arm 12, 14 of a respective rotor blade pair B1, B3; B2, B4.

Figure 10:
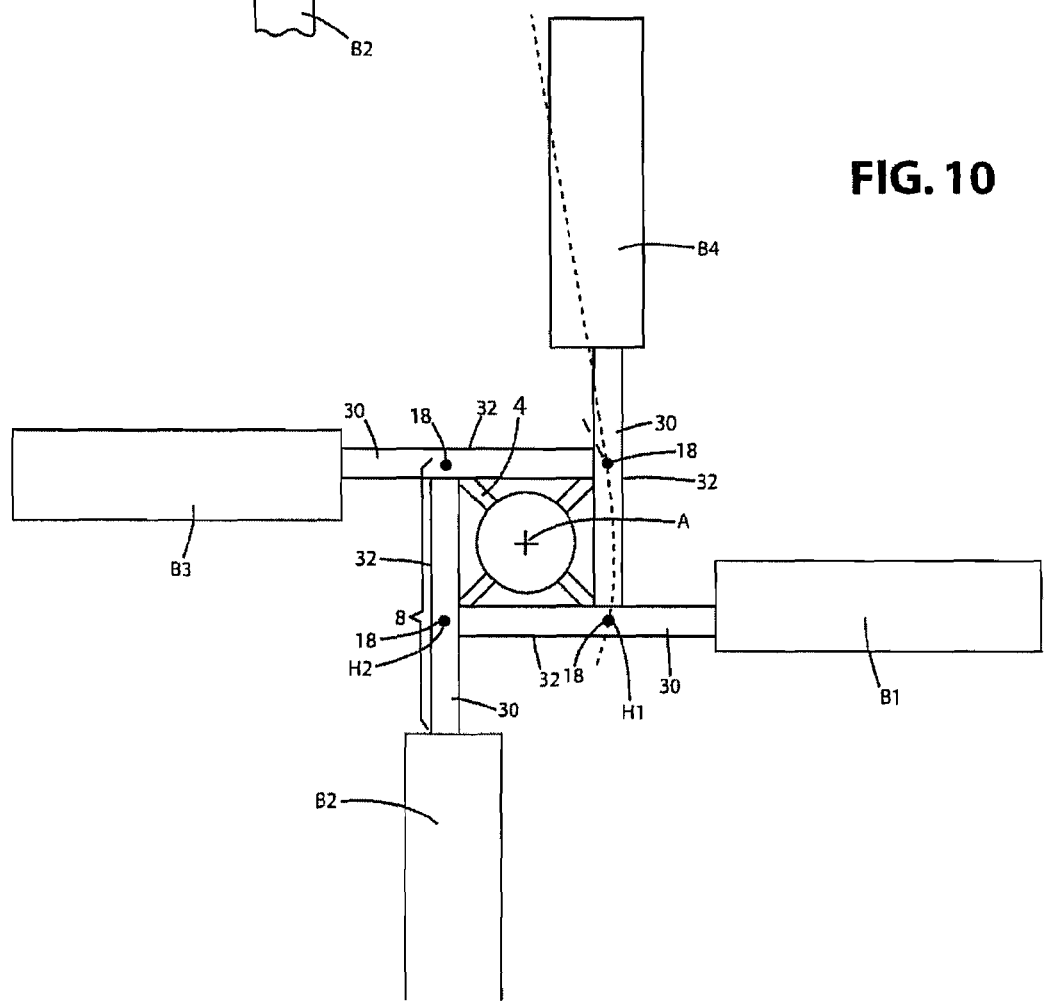
FIG. 10 is a schematic plan view of a rotor according to the present invention in accordance with an eighth embodiment.

FIG. 10 is a schematic perspective plan view of a rotor according to the present invention in accordance with an eighth embodiment. The rotor possesses four rotor blades B1, B2, B3, B4. In this variant, each rotor blade does not have a blade-connector fork having at least two connector arms, but rather has only a single blade-connector arm 30. This arm is, in this case, embodied in flexurally soft fashion in both the flapwise and the lead-lag direction. As is clearly evident from the drawing, the single blade-connector arm 30 of a respective rotor blade B1, B2, B3, B4 extends alongside rotor axis A and past it. At an end region, the single blade-connector arm 30 of a rotor blade B1, B2, B3, B4 is joined in each case to an intermediate portion 32 of a blade-connector arm 30 of a respectively adjacent, similarly configured rotor blade B1, B2, B3, B4. This is accomplished, as in the previous examples, with one bolt 18 in each case. The portions of the respective single blade-connector arms 30 located between bolts 18 form a rectangle around rotor axis A or rotor mast 6.

What is produced on the basis of the configuration described above is, for each rotor blade B1, B2, B3, B4, two mounting points spaced apart from one another in the longitudinal direction of the rotor blade. These mounting points, at which the arms of rotor star 4 also engage, each represent two auxiliary flapping hinges H1, H2, between which the virtual flapping hinge is disposed and between which blade neck 8 is deformable in flexurally elastic and curved fashion in the context of a flapwise motion. Because the respective single blade-connector arm 30 is also flexurally soft in the lead-lag direction, the two auxiliary flapping hinges H1, H2 of a respective rotor blade B1, B2, B3, B4 at the same time also form two auxiliary lead-lag hinges, spaced apart from one another in the radial longitudinal direction of the rotor blade, between which a virtual lead-lag hinge is disposed and between which blade neck 8 is deformable in flexurally elastic and curved fashion in the context of a lead-lag motion of rotor blade B1, B2, B3, B4.

Bolts 18 at the joining points of rotor blades B1, B2, B3, B4 here serve simultaneously as rotary articulation points that facilitate flexion of the relevant single blade-connector arm 30 in the flapwise direction. A lead-lag-pivoted rotor blade is indicated by a dashed line in FIG. 10. In contrast to the embodiments described previously, this rotor is lead-lag-soft and therefore less suitable for tiltrotor helicopters.

Figure 11:
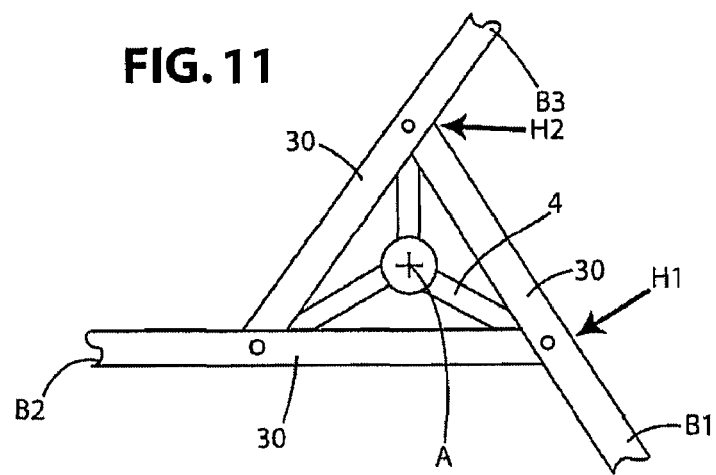
FIG. 11 is a schematic plan view of a rotor according to the present invention in accordance with a ninth embodiment.

FIG. 11 shows, in a schematic top view, a rotor according to the present invention in accordance with a ninth embodiment. This variant corresponds substantially to that of FIG. 10, but is embodied as a three-blade rotor. The portions of the respective single blade-connector arms 30 located between bolts 18 form an equilateral triangle around rotor axis A or the rotor mast.

Figure 12:
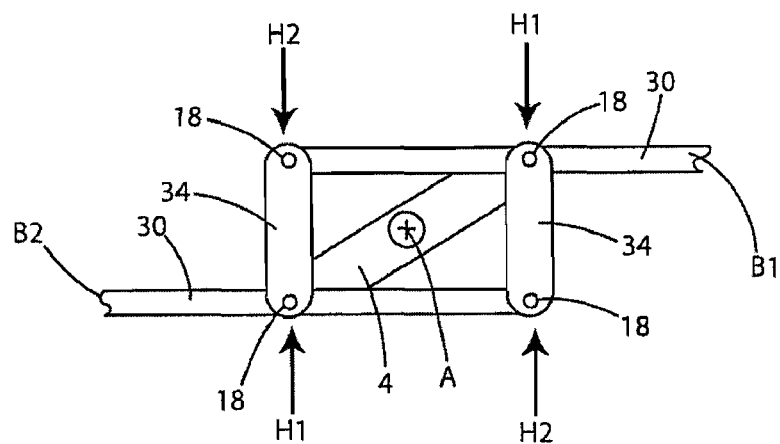
FIG. 12 is a schematic plan view of a rotor according to the present invention in accordance with a tenth embodiment.
Figure 13:
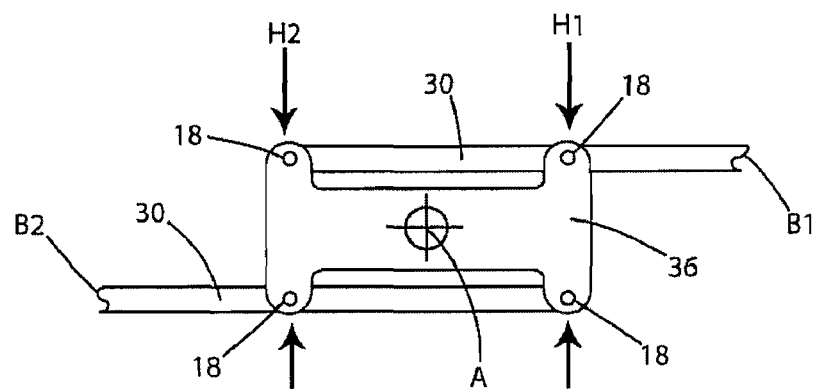
FIG. 13 is a schematic plan view of a rotor according to the present invention in accordance with an eleventh embodiment.

FIGS. 12 and 13 show schematic plan views of a rotor according to the present invention in accordance with a tenth and an eleventh embodiment. The variant corresponds substantially to that of FIGS. 10 and 11, but is configured as a two-blade rotor. This requires, for example, two additional transverse joining elements 34 (see FIG. 12), joining the single blade-connector arms 30 to one another, for nonrotatable attachment of rotor blades B1, B2 to rotor mast 6, or one or more rotor-head plates 36 (see FIG. 13) located one above another and having suitable mounting points spaced apart from one another.

The rotors according to the present invention described in the exemplifying embodiments above are preferably used in a rotorcraft, in particular in a helicopter, having one or more rotors. The variants according to FIGS. 1 and 3 through 10 are particularly suitable, because of their high lead-lag stiffness, for tiltrotor helicopters or tiltrotor aircraft.

The invention is not limited to the exemplifying embodiments above, which serve merely for general explanation of the central concept of the invention. To the contrary, within the scope of protection the rotor according to the present invention can also assume forms of embodiment different from those described concretely above. The rotor can, in particular, exhibit features that represent a combination of the features of the embodiments described. Although only multiple-blade rotors were discussed in the exemplifying embodiments, the principle according to the present invention is also applicable to single-blade rotors or to rotors having 1 to n (1 . . . n) rotor blades. Moreover, the virtual flapping and lead-lag hinge[s] can coincide in a rotor according to the present invention. The auxiliary flapping hinges can also be embodied as three-dimensional hinges that can comprise real and/or virtual hinges.

In the rotor according to the present invention the rotor mast can also, depending on the particular rotor head configuration and the particular rotor mast attachment, end in the axial direction below the rotor-blade plane or below the connector arms. The connector arms can then, however, still extend alongside the rotor axis or around it. It is also conceivable for purposes of the invention to configure base portion 22 to be very narrow, and to have the connector arms extend next to one another at a very small lateral distance. It is furthermore possible to equip a region between the connector arms with a soft, elastic intermediate filling, e.g. an elastic foam or the like, that does not interfere with deformation of the connector arms and can additionally perform enclosing, supporting, and/or stiffening functions.

It is also possible in principle to use, instead of the bolts, a different suitable joining means or centrifugal-force-discharging element, for example an integral joint between the respective connector arms and/or the rotor star or the rotor-head plate, or a rotor-blade connector loop looped around the rotor mast and/or around a rotor-head plate. The loop can be implemented particularly easily by the fact that the two connector arms of the blade-connector fork are, for example, brought together behind the rotor mast into a loop, and joined integrally to one another.

In the examples above, the bolts disposed in the region of the auxiliary flapping hinges perform a multiple function. In particular, in combination with the respectively overlapping or crossing-over blade-connector regions, they form the auxiliary flapping hinges and at the same time receive the centrifugal forces acting on the rotor blades. It is possible, however, to separate these individual functions. It is conceivable, for example, for a respective auxiliary flapping hinge to be configured in centrifugal-force-free and boltless fashion, and to be constituted by a support device, supporting the blade neck, in coaction with the flexurally soft connector arms. Supporting elements or clamping elements on the upper and lower side of the blade neck can serve, for example, as the support device. These elements can be configured, for example, in the form of support rollers, convex supporting-mount elements, elastic clamping elements, and the like. An auxiliary flapping hinge of this kind cannot receive centrifugal forces. Those forces can be, however, compensated for e.g. by way of a bolt that acts only in centrifugal-force-discharging fashion but no longer performs any functions of the auxiliary flapping hinge. It is

What is claimed is:

1. A rotor having a radius and comprising:
   a rotor head; and
   at least two rotor blades connectable to the rotor head, each rotor blade including a blade neck having a blade-connector region including two auxiliary flapping hinges spaced apart from one another in a radial longitudinal direction of the rotor blade and a flexurally elastic blade-neck region forming a virtual flapping hinge disposed substantially between the two auxiliary flapping hinges, the virtual flapping hinge being deformable in a flexurally elastic and curved fashion in response to a flapping motion,
   wherein the blade-connector region includes at least one blade-connector arm and wherein respective blade-connector arms of the at least two rotor blades are joined to each other and overlap each other at a subregion, and wherein one of the auxiliary flapping hinges is disposed at the subregion.

2. The rotor as recited in claim 1, further comprising a further flexurally elastic blade-neck region adjacent to and radially outward from the radially outer of the two auxiliary flapping hinges.

3. The rotor as recited in claim 2, wherein the rotor is a hingeless rotor and wherein the further flexurally elastic blade-neck region forms a virtual lead-lag hinge.

4. The rotor as recited in claim 1, wherein the rotor is a bearingless and hingeless rotor further comprising a virtual lead-lag hinge, and a torsionally flexible blade neck for bearingless blade angle adjustment.

5. The rotor as recited in claim 1, wherein a flapping hinge distance of the rotor is greater than or equal to zero.

6. The rotor as recited in claim 1, wherein a flapping hinge distance of the rotor is less than zero.

7. The rotor as recited claim 1, wherein the virtual flapping hinge is disposed in a region of the blade neck between the two auxiliary flapping hinges.

8. The rotor as recited in claim 1, wherein the two auxiliary flapping hinges simultaneously form two auxiliary lead-lag hinges, spaced apart from one another in a radial direction of the rotor blade, and wherein the rotor further comprises a virtual lead-lag hinge disposed between the two auxiliary lead-lag hinges and wherein the blade neck is deformable in flexurally elastic and curved fashion in response to a lead-lag motion of the rotor blade.

9. The rotor as recited in claim 8, wherein the virtual lead-lag hinge is embodied in lead-lag-stiff fashion.

10. The rotor as recited in claim 1, wherein at least one of the auxiliary flapping hinges includes a swivel joint.

11. The rotor as recited in claim 1, wherein at least one of the auxiliary flapping hinges is formed by a flexurally elastic portion of the blade neck.

12. The rotor as recited in claim 1, wherein at least one of the auxiliary flapping hinges is formed by a support device supporting the blade neck in the region of the auxiliary flapping hinge.

13. The rotor as recited in claim 1, wherein the at least two rotor blades include common auxiliary flapping hinges disposed in a common blade-neck joining region.

14. The rotor as recited in claim 1, wherein the at least two rotor blades each lie at an offset from one another of approximately 180 degrees with reference to the rotor disc and form a rotor blade pair,
   wherein the rotor blade pair includes two common auxiliary flapping hinges and one common virtual flapping hinge.

15. The rotor as recited in one claim 1, wherein the blade-connector region of the blade neck of a respective rotor blade is embodied in the form of a single blade-connector arm, the single blade-connector arm extends alongside an axis of the rotor axis and past it, and is joined to an intermediate portion of a respectively adjacent, similarly configured rotor blade.

16. The rotor as recited in claim 1, wherein the blade-connector region of the blade neck, is embodied in the form of a blade-connector fork having at least two blade-connector arms discharging centrifugal-force.

17. The rotor as recited in claim 1, and axis of the rotor extends between the at least two blade-connector arms.

18. The rotor as recited in claim 1, the at least one blade-connector arm includes at least two blade-connector arms, at least one of which includes an arm end, embodied as a fork terminal, that engages in the region of one of the two auxiliary flapping hinges and is joined to a blade-connector arm region of a blade-connector arm of a respective other rotor blade.

19. The rotor as recited in claim 1, wherein the at least one blade-connector arm is divided into at least two blade-connector arm segments located one above another in a direction of a rotor axis.

20. The rotor as recited in claim 1, wherein the at least one blade-connector arms includes a fork having at least two blade-connector arms and wherein the rotor blades and at least one subregion receives centrifugal forces of the respective other rotor blade.

21. The rotor as recited in claim 20, wherein the blade-connector arms of the rotor blades that are joined to one another via their blade-connector forks overlap at least in subregions.

22. The rotor as recited in claim 20, wherein the at least two blade-connector arms extend in different planes.

23. The rotor as recited in claim 20, wherein the blade-connector arms are strip- or plate-shaped.

24. The rotor as recited in one claim 1, wherein the at least one rotor blade is nonrotatably joined in the region of the two auxiliary flapping hinges, via a torque-transmission element, to a rotor mast.

25. The rotor as recited in claim 24, wherein the torque-transmission element engages the rotor blades at the subregion at a location at which least one of the auxiliary flapping hinges is located.

26. The rotor as recited in claim 1, wherein the torque-transmission element is flexurally elastic in a flapping direction of the at least one rotor blade.

27. The rotor as recited in claim 1, wherein the rotor blade has in the blade-connector region at least two centrifugal-force-discharge elements, spaced apart from one another in the longitudinal direction or centrifugal-force direction, of which at least one receives, during continuous operation of the rotor, the centrifugal forces occurring at the rotor blade.

28. The rotor as recited in claim 1, wherein at least a portion of one of the two auxiliary flapping hinges is configured as a centrifugal element.

29. The rotor as recited in claim 1, wherein the rotor blades are joined to one another in the region of their auxiliary flapping hinges, and at least a portion of one respective auxiliary flapping hinge embodied as a centrifugal-force-discharge element for at least one respective other rotor blade.

30. A rotorcraft having at least one rotor as recited in claim 1.

31. The rotorcraft as recited in claim 30, wherein the rotorcraft includes at least one of a helicopter and a tiltrotor helicopter.

* * * * *